(12) United States Patent
Hirao et al.

(10) Patent No.: US 10,926,602 B2
(45) Date of Patent: Feb. 23, 2021

(54) SUSPENSION CONTROL APPARATUS

(71) Applicant: HITACHI AUTOMOTIVE SYSTEMS, LTD., Ibaraki (JP)

(72) Inventors: Ryusuke Hirao, Kamagaya (JP); Kentaro Kasuya, Utsunomiya (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 167 days.

(21) Appl. No.: 16/333,658

(22) PCT Filed: Sep. 13, 2017

(86) PCT No.: PCT/JP2017/033032
§ 371 (c)(1),
(2) Date: Mar. 15, 2019

(87) PCT Pub. No.: WO2018/061770
PCT Pub. Date: Apr. 5, 2018

(65) Prior Publication Data
US 2019/0255903 A1    Aug. 22, 2019

(30) Foreign Application Priority Data
Sep. 28, 2016 (JP) ................................. 2016-189922

(51) Int. Cl.
*B60G 17/018* (2006.01)
*B60G 17/019* (2006.01)
*B60G 17/015* (2006.01)

(52) U.S. Cl.
CPC ......... *B60G 17/018* (2013.01); *B60G 17/015* (2013.01); *B60G 17/01908* (2013.01);
(Continued)

(58) Field of Classification Search
CPC ................ B60G 17/018; B60G 17/015; B60G 17/01908; B60G 2206/42;
(Continued)

(56) References Cited

U.S. PATENT DOCUMENTS

| 2009/0085309 A1* | 4/2009 | Hirao | ................... B60G 17/015 280/5.503 |
| 2011/0160960 A1* | 6/2011 | Kajino | ................. B60G 17/025 701/38 |

(Continued)

FOREIGN PATENT DOCUMENTS

| JP | 2001-287528 | 10/2001 |
| JP | 2006-321296 | 11/2006 |

(Continued)

OTHER PUBLICATIONS

International Search Report dated Dec. 19, 2017 in International (PCT) Application No. PCT/JP2017/033032.

*Primary Examiner* — Rodney A Butler
(74) *Attorney, Agent, or Firm* — Wenderoth, Lind & Ponack, L.L.P.

(57) ABSTRACT

An object of the present invention is to provide a suspension control apparatus allowing a vehicle state to be easily estimated with use of a vehicle height sensor. A controller 11 includes an external force estimation portion 31, which calculates an external force applied to a vehicle body from a displacement calculated from a vehicle height sensor 10, a vertical force calculation portion 32A, which calculates a vertical force of the vehicle body 1 from the calculated external force, a sprung acceleration calculation portion 32B, which calculates an acceleration from the calculated vertical force, a filter portion 32C, which estimates a sprung speed of the vehicle body 1 from the calculated acceleration, and a damping characteristic determination portion 14, (Continued)

which acquires a damping characteristic based on the estimated sprung speed.

7 Claims, 11 Drawing Sheets

(52) U.S. Cl.
CPC .. *B60G 2206/42* (2013.01); *B60G 2400/0531* (2013.01); *B60G 2400/0532* (2013.01)

(58) Field of Classification Search
CPC .... B60G 2400/0531; B60G 2400/0532; B60G 2400/102; B60G 2400/252; B60G 2206/427
See application file for complete search history.

(56) References Cited

U.S. PATENT DOCUMENTS

| | | | |
|---|---|---|---|
| 2014/0095024 A1* | 4/2014 | Hirao | B60G 17/016 701/37 |
| 2015/0088379 A1* | 3/2015 | Hirao | B60G 17/08 701/37 |
| 2016/0107498 A1* | 4/2016 | Yamazaki | B60G 17/0164 701/37 |

FOREIGN PATENT DOCUMENTS

| | | |
|---|---|---|
| JP | 2009-083614 | 4/2009 |
| JP | 2009-173089 | 8/2009 |
| JP | 2015-132182 | 7/2015 |
| JP | 2015-150912 | 8/2015 |

* cited by examiner

SUSPENSION CONTROL APPARATUS

TECHNICAL FIELD

The present invention relates to a suspension control apparatus mounted on a vehicle, such as an automobile, and configured to control a vibration of the vehicle.

BACKGROUND ART

Generally, as a suspension control apparatus mounted on a vehicle, such as an automobile, there is known an apparatus provided with a control damper (a shock absorber) capable of exerting an adjustable damping force between a vehicle body and each axle and configured to adjust a characteristic of the damping force to be exerted by the control damper with use of a controller (for example, refer to PTL 1).

CITATION LIST

Patent Literature

[PTL 1] Japanese Patent Application Public Disclosure No. 2001-287528

SUMMARY OF INVENTION

Technical Problem

Then, PTL 1 discloses a configuration that estimates a vehicle state with use of an observer from information input from a vehicle height sensor. However, the observer is accompanied by a matrix calculation, and therefore the calculation tends to be complicated. Further, this configuration involves a problem of leading to an increase in the number of tuning parameters and thus making tuning difficult because a weight should be designed to calculate the observer.

An object of the present invention is to provide a suspension control apparatus allowing the vehicle state to be easily estimated with use of the vehicle height sensor.

Solution to Problem

According to one aspect of the present invention, a suspension control apparatus includes a damping force adjustable shock absorber disposed between a vehicle body of a vehicle and each of four wheels and having a damping characteristic varying according to an instruction from outside, a vehicle height sensor provided on each of the wheels of the vehicle body, and a control device configured to control the damping characteristic. The controller includes an external force calculation unit configured to calculate an external force applied to the vehicle body from a displacement calculated from the vehicle height sensor, a vertical force calculation unit configured to acquire a vertical force on the vehicle body from this calculated external force, an acceleration calculation unit configured to calculate an acceleration from the vertical force acquired by the vertical force calculation unit, a sprung speed estimation unit configured to estimate a sprung speed of the vehicle body from the acceleration calculated by the acceleration calculation unit, and a damping characteristic determination unit configured to acquire the damping characteristic based on the estimated sprung speed acquired by the sprung speed estimation unit.

According to the one aspect of the present invention, the vehicle state can be easily estimated with use of the vehicle height sensor.

DESCRIPTION OF EMBODIMENTS

Figure 1:
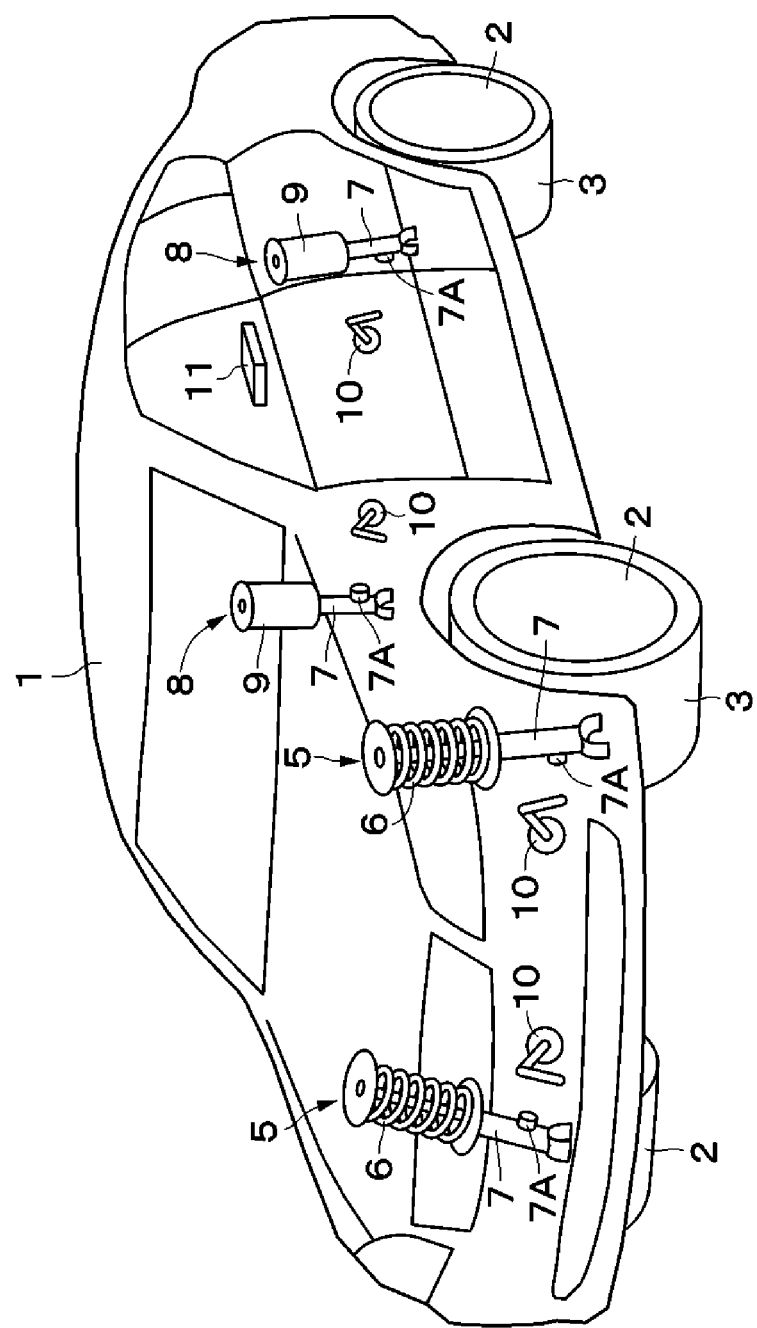
FIG. 1 is a perspective view illustrating a vehicle to which a suspension control apparatus according to an embodiment of the present invention is applied.

In the following description, a suspension control apparatus according to an embodiment of the present invention will be described in detail with reference to the accompanying drawings based on an example in which the suspension control apparatus is applied to, for example, a four-wheeled automobile.

For avoiding complication of the description, the suspension control apparatus will be described, adding indexes indicating front right (FR), front left (FL), rear right (RR), and rear left (RL) to reference numerals. When front right, front left, rear right, and rear left are collectively referred to, they will be described with the index removed from the reference numeral. Similarly, the suspension control apparatus will be described, adding indexes indicating front (F) and rear (R) to the reference numerals. When front and rear are collectively referred to, they will be described with the index removed from the reference numeral.

In FIG. 1, a vehicle body 1 forms a main structure of the vehicle. For example, a front right wheel 2FR, a front left wheel 2FL, a rear right wheel 2RR, and a rear left wheel 2RL (hereinafter collectively referred to as the wheel 2) are provided below the vehicle body 1. The wheel 2 includes a tire 3. The tire 3 functions as a spring that absorbs fine roughness of a road surface.

Figure 14:
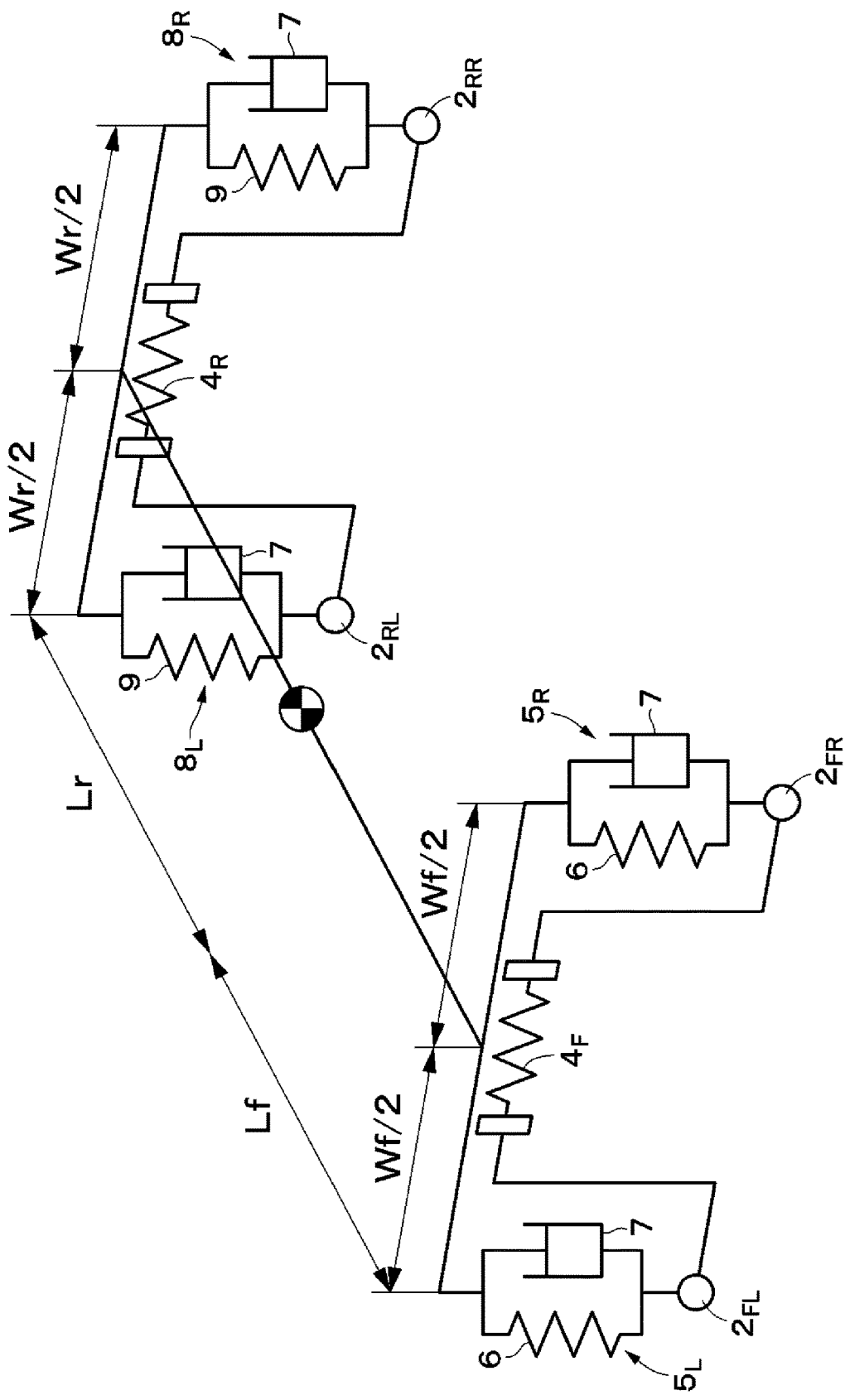
FIG. 14 illustrates a vehicle model used to design the state estimation portion.

Further, a stabilizer 4F is provided between the front right wheel 2FR and the front left wheel 2FL (refer to FIG. 14). Similarly, a stabilizer 4R is also provided between the rear right wheel 2RR and the rear left wheel 2RL. This stabilizer 4 is a stabilizer mechanism provided on the vehicle. The stabilizer 4 is installed on the vehicle body 1 via, for example, a pair of installation bushes laterally spaced apart from each other. Then, the stabilizer 4F on the front side generates a stabilizer reaction force FstbF according to torsional stiffness due to generation of a roll or a difference in a vertical motion between the front right wheel 2FR and the front left wheel 2FL. Similarly, the stabilizer 4R on the rear side generates a stabilizer reaction force FstbR according to torsional stiffness due to generation of a roll or a difference in a vertical motion between the rear right wheel 2RR and the rear left wheel 2RL.

A suspension apparatus 5 on the front wheel side is disposed between the vehicle body 1 and the wheel 2 (the front right wheel 2FR and the front left wheel 2FL). As illustrated in FIG. 1, the suspension apparatus 5 includes a coil spring 6 as a suspension spring, and a damping force adjustable damper (hereinafter referred to as the damper 7) as a damping force adjustable shock absorber disposed between the vehicle body 1 and each of the four wheels 2 while being provided in parallel with the coil spring 6.

A suspension apparatus 8 on the rear wheel side is disposed between the vehicle body 1 and the wheel 2 (the rear right wheel 2RR and the rear left wheel 2RL). The suspension apparatus 8 includes an air spring 9, and the damper 7 disposed between the vehicle body 1 and each of the wheels 2 while being provided in parallel with the air spring 9. This suspension apparatus 8 forms an air levelizer used in combination with a coil spring. The suspension apparatus 8 serves to adjust a vehicle height, which is a distance between the wheel 2 and the vehicle body 1, due to supply or discharge of air as hydraulic fluid to or from the air spring 9.

Now, the damper 7 of each of the suspension apparatuses 5 and 8 is constructed with use of a damping force adjustable hydraulic shock absorber, such as a semi-active damper. This damper 7 is equipped with an actuator 7A embodied by a damping force adjustment valve or the like for adjusting a characteristic of a generated damping force (a damping force characteristic) from a hard characteristic (a high characteristic) to a soft characteristic (a low characteristic).

The damping characteristic of the damper 7 changes according to an instruction input from outside. More specifically, the damping force characteristic of the damper 7 is adjusted according to a relative speed x* between the vehicle body 1 and the wheel 2 and a target damping coefficient C0 (a corrected damping coefficient Ca). More specifically, a controller 11 outputs an instruction current i according to the relative speed x* and the target damping coefficient C0. The damper 7 generates a damping force according to the instruction current i output from the controller 11.

A vehicle height sensor 10 is provided on each of the wheels of the vehicle body 1. The vehicle height sensor 10 is a vehicle height detection device, and detects a vehicle height according to extension or compression of the suspension apparatus 5 or 8. The vehicle height sensor 10 outputs a signal indicating the detected vehicle height to the controller 11.

The controller 11 includes a microcomputer and the like, and forms a control device that controls the damping characteristic. An input side of the controller 11 is connected to the vehicle height sensor 10, and is also connected to a CAN 12 (a Controller Area Network) to which various kinds of information such as a vehicle speed and a pressure Pas of the air spring 9 are transmitted. By these connections, the controller 11 acquires the information such as the vehicle height, the vehicle speed, and the pressure Pas of the air spring 9. Further, an output side of the controller 11 is connected to the actuator 7A of the damper 7. The controller 11 estimates a sprung speed Vcg of the vehicle body 1 based on the information such as the vehicle height. The controller 11 acquires a damping characteristic that the damper 7 should generate based on the estimated sprung speed Vcg. The controller 11 outputs the instruction current i according to the acquired damping characteristic to the actuator 7A, thereby controlling the damping characteristic of the damper 7.

Figure 2:
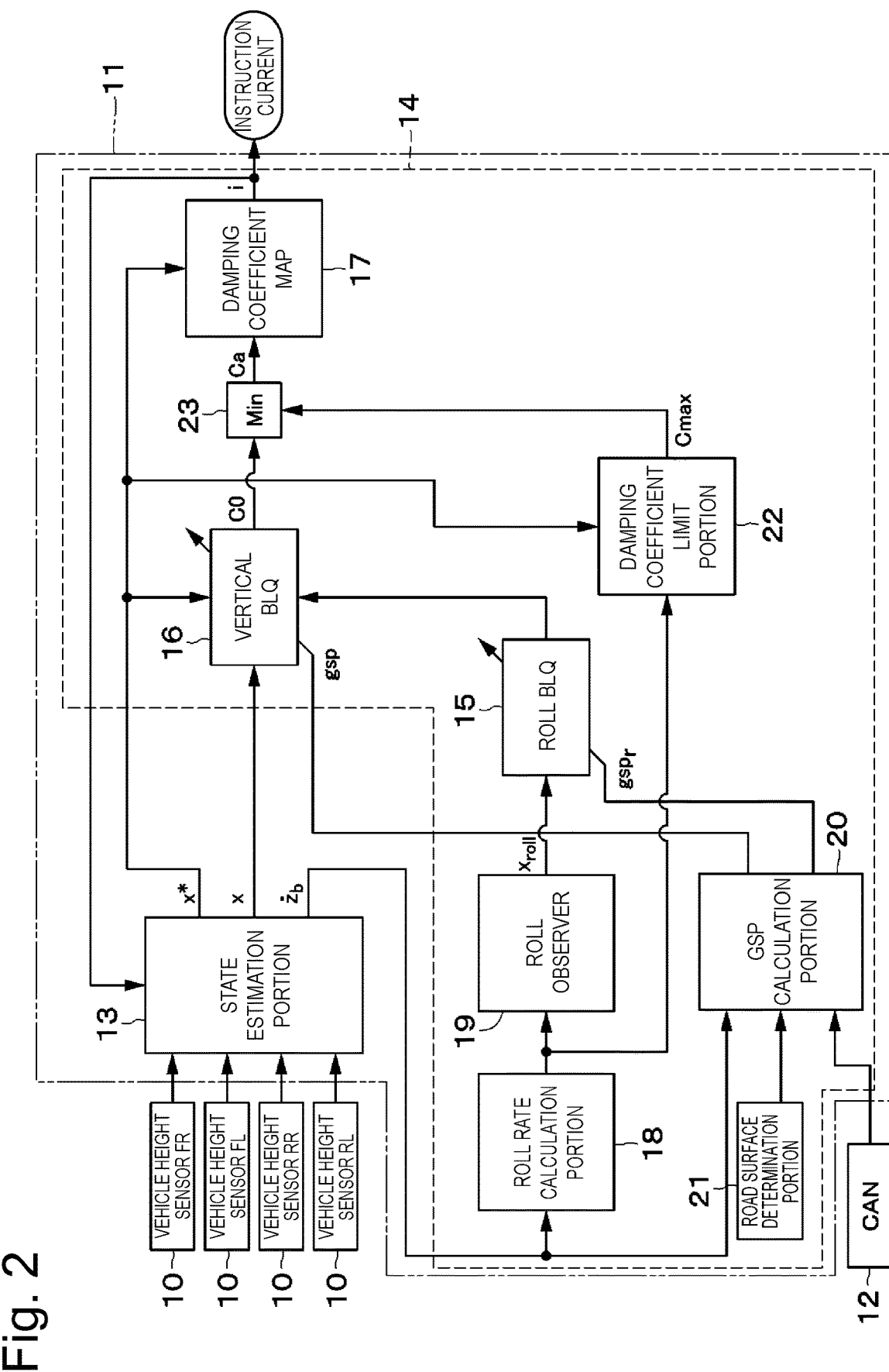
FIG. 2 is a block diagram illustrating a configuration of a controller illustrated in FIG. 1.

As illustrated in FIG. 2, the controller 11 includes a state estimation portion 13 and a damping characteristic determination portion 14. The state estimation portion 13 estimates a state of the vehicle. The damping characteristic determination portion 14 acquires the damping characteristic based on a result of the estimation by the state estimation portion 13. The damping characteristic determination portion 14 forms a damping characteristic determination unit, which acquires the damping characteristic based on the estimated sprung speed Vcg acquired by a filter portion 32C, which will be described below.

Now, the damping characteristic determination portion 14 is constructed based on a logic in consideration of a vertical motion of each of the wheels and a roll motion of the vehicle body, which is taken into consideration in the skyhook control, to achieve a control law having a similar function to the skyhook control. Therefore, the damping characteristic determination portion 14 employs a control logic formulated by designing a control system handling the vertical motion and a control system handling the roll motion individually independently and integrating them. This allows tuning parameters corresponding to the vertical motion and the roll motion to be also independently set, thereby improving tuning flexibility.

For realizing this function, the damping characteristic determination portion 14 includes a roll motion hyperbolic optimization control portion 15 (hereinafter referred to as a roll BLQ 15) handling the roll motion, a vertical motion hyperbolic optimization control portion 16 (hereinafter referred to as a vertical BLQ 16) handling the vertical motion, and a damping coefficient map 17 as an instruction current calculation portion.

Figure 13:
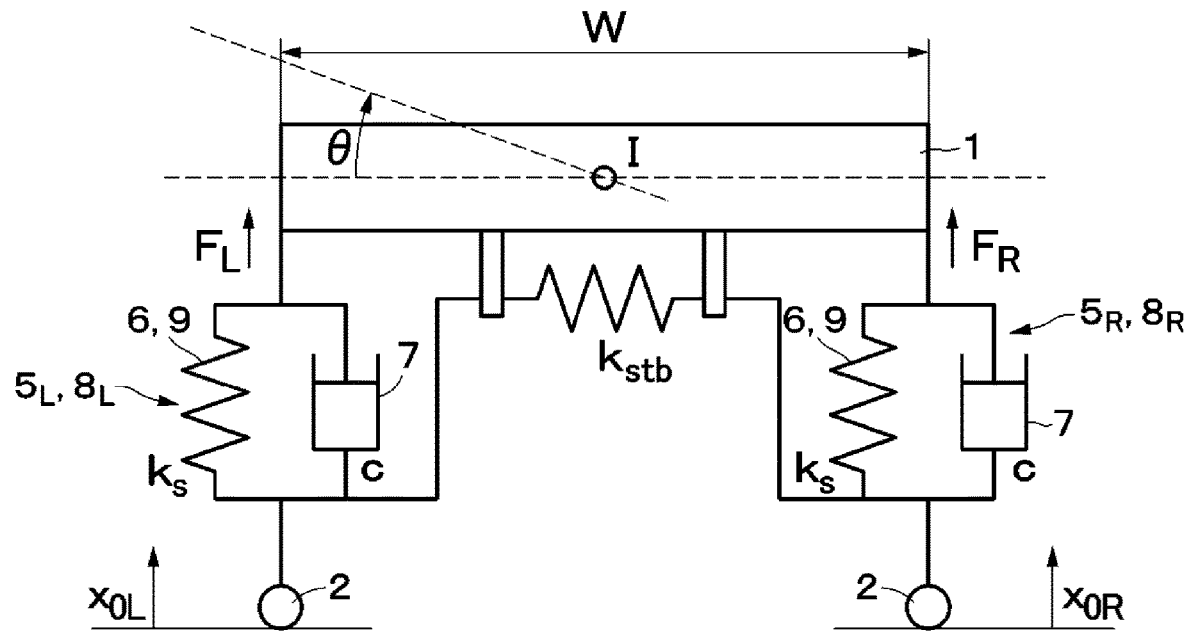
FIG. 13 illustrates a vehicle model used to design the roll BLQ.

The roll BLQ 15 is connected to the state estimation portion 13 via a roll rate calculation portion 18 and a roll observer 19. The roll rate calculation portion 18 is connected to an output side of the state estimation portion 13, and calculates a roll rate applied to a center of gravity of the vehicle body 1. The roll observer 19 calculates an estimated state amount xroll including a roll angle from the roll rate output from the roll rate calculation portion 18. The roll BLQ 5 calculates a damping force of the damper 7 for reducing a roll vibration based on the estimated state amount xroll output from the roll observer 19. The roll BLQ 15 is designed based on, for example, a motion model illustrated in FIG. 13 that is prepared in consideration of the roll. The motion model illustrated in FIG. 13 is a single-degree-of-freedom rotational motion model simplest as the vehicle model prepared in consideration of the roll. In this motion model, θ, x0R and x0L, I, ks, kstb, c, FR and RL, and W are set to represent a roll angle of the vehicle body, respective absolute vertical displacements on the left and right wheels on a road surface, a vehicle body roll inertia, a spring constant between the vehicle body and an unsprung side, a spring constant of the stabilizer, a damper damping coefficient, external forces on the left and right wheels that are applied to between the vehicle body and the unsprung side, and a distance between each of the suspension apparatuses 5L and 8L on the left side and the suspension apparatuses 5R and 8R on the left side, respectively.

Figure 12:
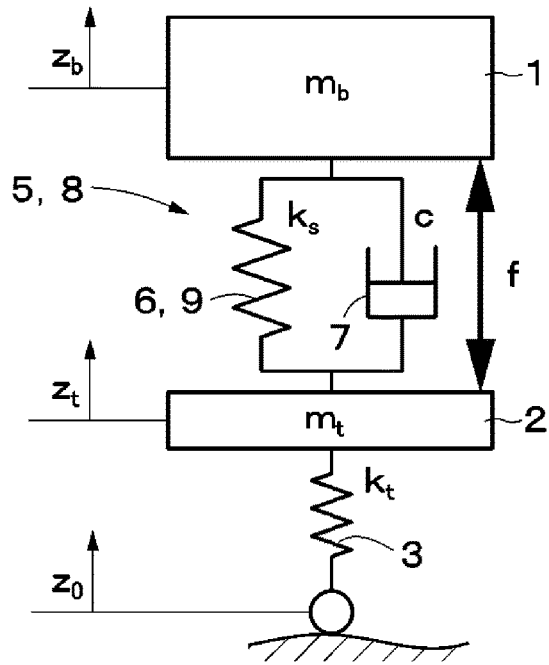
FIG. 12 illustrates a control design model directed to a vertical motion.

The vertical BLQ 16 is connected to the output side of the state estimation portion 13. The vertical BLQ 16 calculates a target damping coefficient C0 of the damper 7 for reducing the vertical vibration and the roll vibration based on the estimated state amount x output from the state estimation portion 13 and the damping force for roll control that is output from the roll BLQ 15. The vertical BLQ 16 is designed based on, for example a control design model illustrated in FIG. 12. FIG. 12 illustrates the control design model in the case where one set of the suspension apparatus 5 or 8 is provided between the vehicle body 1 and the wheel 2 by way of example. However, the suspension apparatuses 5 and 8 are supposed to be installed in such a manner that, for example, four sets in total are provided individually independently between the four wheels 2 and the vehicle body 1, and FIG. 12 schematically illustrates only one set among them. In this model, zb, zt, z0, mb, mt, ks, kt, c, and f are set to represent an absolute vertical displacement of the vehicle body 1, an absolute vertical displacement on the unsprung side, an absolute vertical displacement on the road surface, a mass of the vehicle body, a mass on the unsprung side, a spring coefficient between the vehicle body 1 and the unsprung side, a tire spring constant, a damper damping coefficient, and a control force applied to between the vehicle body and the unsprung side, respectively. The absolute vertical displacement zb with a dot symbol added above it indicates a time differential of the displacement zb.

Further, the vertical BLQ 16 and the roll BLQ 15 prepare a plurality of types (for example, three types) of gains acquired by solving the Riccati equation from a weight emphasizing a floating sensation or a bobbing sensation in advance to achieve a control law having similar adaptability to the skyhook control. These gains are assigned in a map to which scheduling parameters gsp and gspr (hereinafter referred to as the parameters gsp and gspr) are inputs, and the parameters gsp and gspr are continuously scheduled. Due to this configuration, the vertical BLQ 16 and the roll BLQ 15 achieve a logic in which the gain can be adjusted.

For realizing this function, a gain scheduling parameter calculation portion 20 (hereinafter referred to as the GSP calculation portion 20) calculates the parameters gsp and gspr according to a state of the road surface based on the vehicle speed acquired from the CAN 12 and a result of a determination about the road surface by a road surface determination portion 21. This GSP calculation portion 20 outputs the parameter gsp according to the vertical motion to the vertical BLQ 16, and outputs the parameter gspr according to the roll motion to the roll BLQ 15.

Then, the road surface determination portion 21 determines the state of the road surface on which the vehicle is currently running based on, for example, the signal indicating the detected vehicle height that is acquired by the vehicle height sensor 10. More specifically, the road surface determination portion 21 determines a "wavy road", a "bad road", an "ordinary road", and the like based on an amplitude, a frequency, and the like of the vehicle height. The road surface determination portion 21 outputs the result of the determination about the road surface toward the GSP calculation portion 20.

A damping coefficient limit portion 22 switches a limit value of the damping coefficient based on values of the relative speed x* and the roll rate to achieve a control law capable of satisfying both roll suppression and a smooth ride feeling. For realizing this function, the damping coefficient limit portion 22 calculates the limit value (a maximum damping coefficient Cmax) of the damping coefficient based on the relative speed x* and the roll rate.

Now, the skyhook control includes force control, so that the instruction value is unintentionally discontinuously changed from a zero side to a plus side (a minus side) when the relative speed x* reaches around zero. However, because receiving the damping coefficient as the input thereof, the hyperbolic optimization control can prevent or reduce a sudden change in the damping force to thus smoothly damp the vibration by setting a limit on the damping coefficient.

Figure 4:
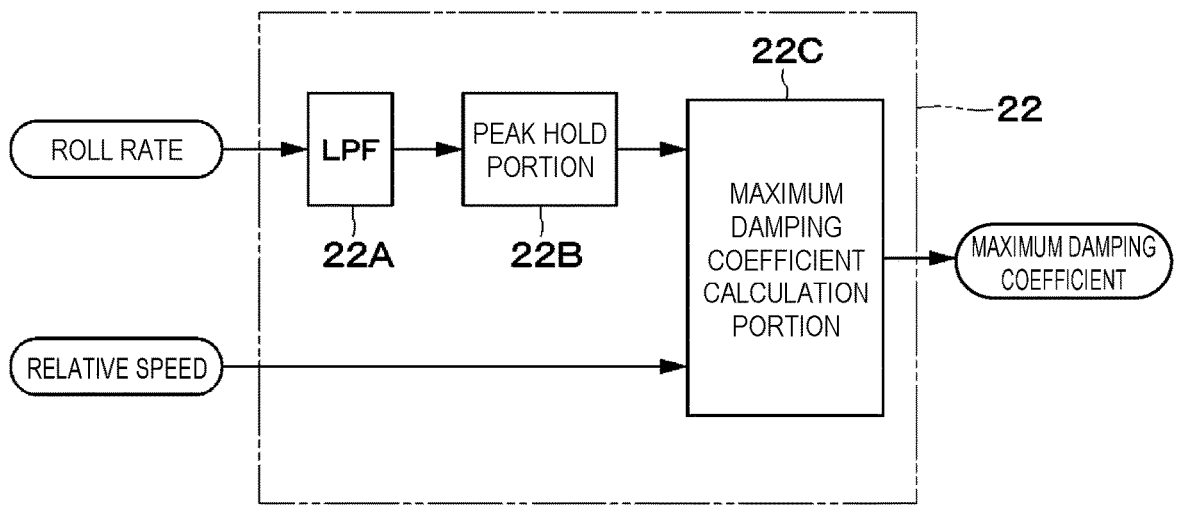
FIG. 4 is a block diagram illustrating a damping coefficient limit portion illustrated in FIG. 2.

With use of this characteristic, the logic for changing the maximum damping coefficient Cmax according to the relative speed x* and the roll rate is constructed as illustrated in FIG. 4. More specifically, the damping coefficient limit portion 22 includes a low-pass filter 22A, a peak hold portion 22B, and a maximum damping coefficient calculation portion 22C. In this case, the low-pass filter 22A outputs a low-frequency component of the roll rate. The peak hold portion 22B holds a peak of a signal output from the low-pass filter 22A, and inputs it to the maximum damping coefficient calculation portion 22C. At this time, the peak hold portion 22B updates the peak value of the roll rate per cycle. The maximum damping coefficient calculation portion 22C calculates the maximum damping coefficient Cmax based on the peak value of the roll rate output from the peak hold portion 22B and the relative speed x*.

Figure 5:
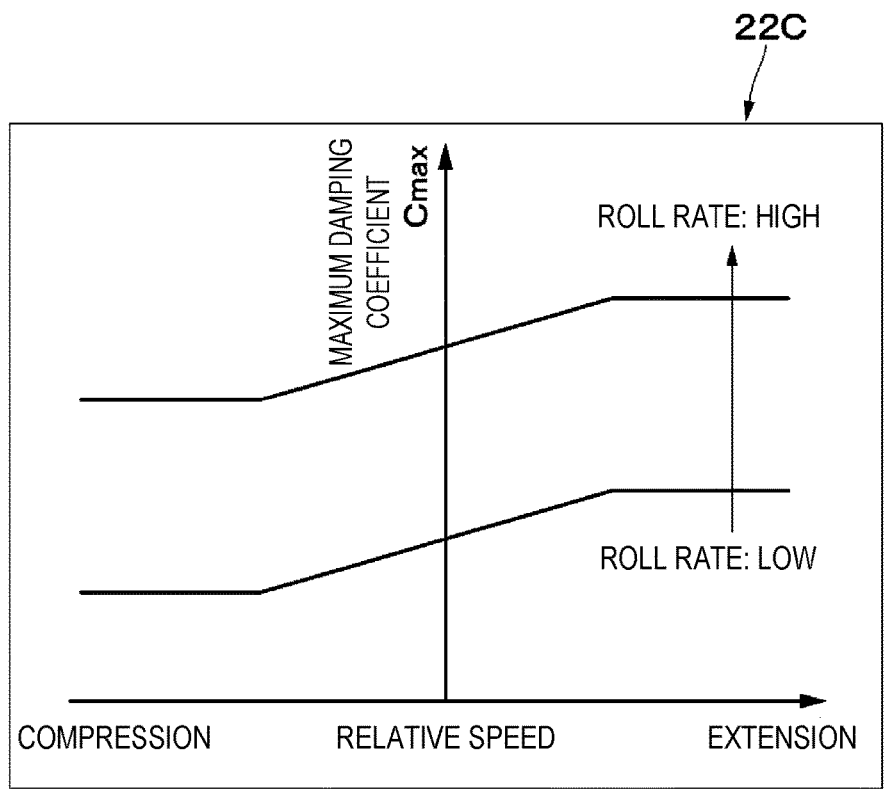
FIG. 5 illustrates a maximum damping coefficient calculation portion illustrated in FIG. 4.

As illustrated in FIG. 5, the maximum damping coefficient calculation portion 22C is configured to be able to set values of the damping coefficient (the maximum damping coefficient Cmax) individually on an extension side and a compression side of the relative speed x*. This is because most semi-active dampers have different damping coefficients as respective damping coefficients on the extension side and the compression side, and the maximum damping coefficient calculation portion 22C is configured to deal with it. Further, the maximum damping coefficient calculation portion 22C is configured to increase the maximum damping coefficient Cmax according to the roll rate.

Further, the maximum damping coefficient calculation portion 22C changes the maximum damping coefficient Cmax according to the peak value calculated by the peak hold portion 22B, i.e., the peak value of the roll rate updated per cycle so as to allow the maximum damping coefficient Cmax to vary according to the value of the roll rate. Because the relative speed x* is often an extremely low speed when a roll behavior occurs, and limiting the damping coefficient may lead to an unintentional reduction in a performance of suppressing the roll behavior, the maximum damping coefficient calculation portion 22C is configured in this manner for the purpose of preventing it. However, this configuration leads to an unintentional increase in the limit on the damping coefficient with the aim of suppressing the roll, thus easily causing a sudden change in the damping force. The performance of suppressing the roll and a jerk due to the sudden change in the damping force are in a trade-off relationship therebetween.

As illustrated in FIG. 2, a minimum value selection portion 23 compares the maximum damping coefficient Cmax output from the damping coefficient limit portion 22 and the target damping coefficient C0 output from the vertical BLQ 16. The minimum value selection portion 23 selects a smaller one of the maximum damping coefficient Cmax and the target damping coefficient C0 to limit the value of the target damping coefficient C0 to the maximum damping coefficient Cmax or smaller, and outputs it toward the damping coefficient map 17 as the corrected damping coefficient Ca.

Figure 3:
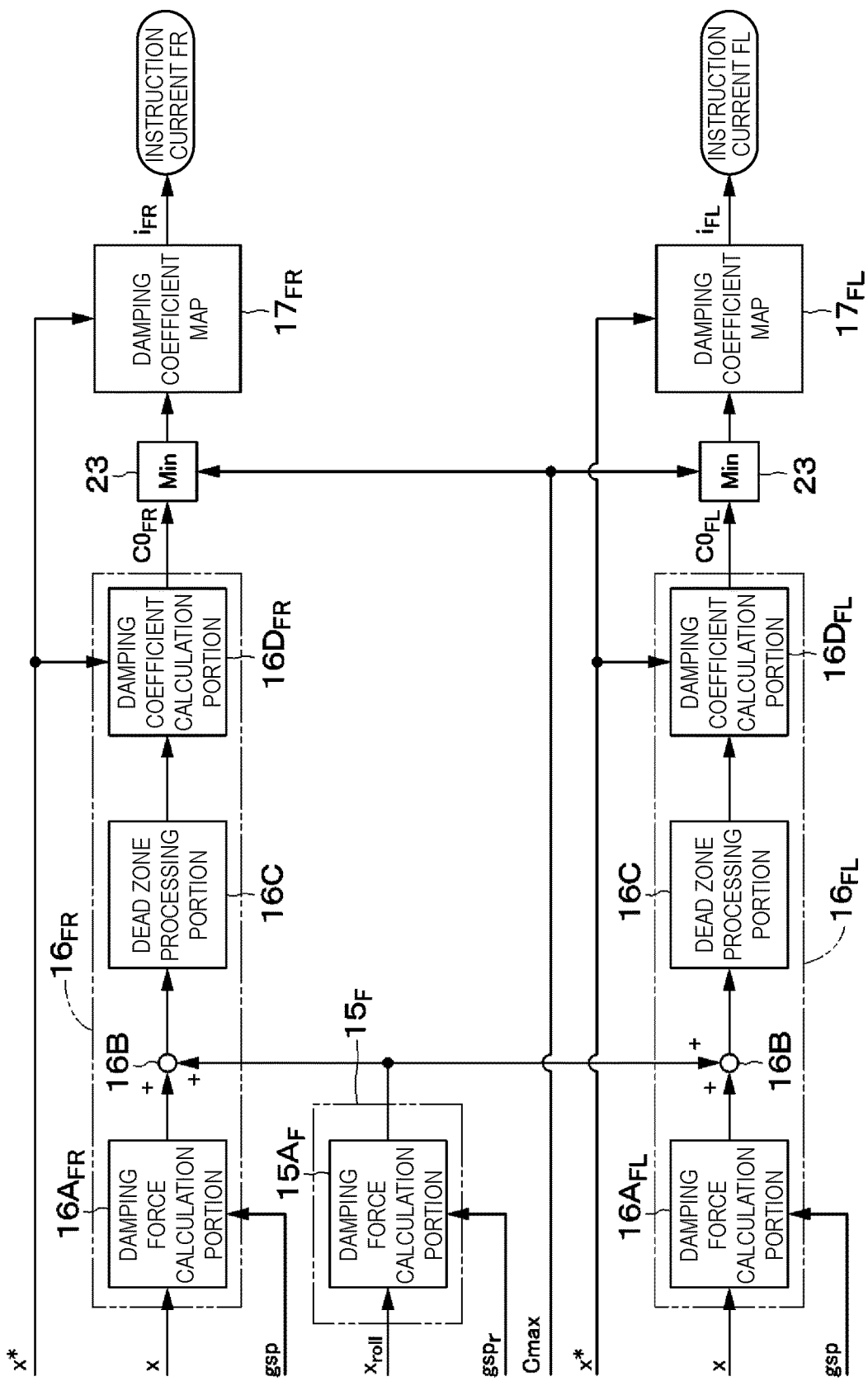
FIG. 3 is a block diagram illustrating a vertical BLQ, a roll BLQ, a damping coefficient map, and the like illustrated in FIG. 2.

Further, the damping characteristic determination portion 14 includes the control systems individually independently designed with respect to the vertical motion and the roll motion. Therefore, they should be integrated. For realizing this integration, a damping coefficient of each of the wheels is acquired by adding a force corresponding to the vertical motion and a force corresponding to the roll motion as the damping force based on an optimum control input of each of the vertical motion and the roll motion. Such a control logic is constructed, for example, as illustrated in FIG. 3. FIG. 3 illustrates the specific configurations of the vertical BLQs 16FR and 16FL and the roll BLQs 15FR and 15FL on the front wheel side, and the same also applies to the rear wheel side.

Then, the roll BLQ 15F includes a damping force calculation portion 15AF. Further, the vertical BLQs 16FR and 16FL include damping force calculation portions 16AFR and 16AFL, adders 16B, dead zone processing portions 16C, and damping coefficient calculation portions 16DFR and 16DFL, respectively.

The damping force calculation portions 16AFR and 16AFL each calculate a damping force based on a gain invRBp assigned according to a value of the parameter gsp and the estimated state amount x. The damping force calculation portion 15AF calculates a damping force based on a gain invRBproll assigned according to a value of the parameter gspr and the estimated state amount xroll.

The sign of the gain invRBp is inverted between the damping force calculation portion 16AFR for the front right wheel and the damping force calculation portion 16AFL for the front left wheel. Therefore, if the gain of one of them has a positive value (invRBp), the gain of the other of them has a negative value (−invRBp).

Further, the roll BLQ 15F outputs a damping force for the left/right wheel as the damping force corresponding to the roll control. Therefore, the adder 16B adds the value of the damping force corresponding to the roll control to the damping force corresponding to the vertical control for each of the left and right wheels, thereby outputting the damping force for each of the wheels.

The dead zone processing similar to the skyhook control is added to the damping force calculated in this manner by the dead zone processing portion 16C. Due to this addition, unnecessary control on a slight vibration is prevented. The damping coefficient calculation portion 16D calculates a damping coefficient instruction (target damping coefficients C0FR and C0FL) by multiplying the damping force with the dead zone added therein that is calculated by the dead zone processing portion 16C by an inverse matrix of x* (the relative speed). Instruction currents iFR and iFL are calculated and set as damper instruction values for the respective wheels by inputting a damping coefficient instruction value acquired by limiting this value based on the maximum damping coefficient Cmax to the damping coefficient map 17.

The damping coefficient map 17 forms a control signal output unit, and outputs an instruction current value (the instruction current i) as a control signal corresponding to the corrected damping coefficient Ca. The damping coefficient map 17 serves to variably set a relationship between the corrected damping coefficient Ca and the instruction current i according to the relative speed x*, and is generated based on test data acquired by, for example, the inventors. Then, the damping coefficient map 17 identifies the instruction current i for adjusting the damping force characteristic of the damper 7 based on the corrected damping coefficient Ca from the minimum value selection portion 23 and the relative speed x*, and outputs this instruction current i to the actuator 7A of the damper 7.

(1). Configuration of State Estimation Portion

Next, a configuration of the state estimation portion 13 will be described. The state estimation portion 13 estimates a vehicle body acceleration from the vehicle height information based on a full vehicle model in consideration of the pitch and roll that is illustrated in FIG. 14. After that, the state estimation portion 13 estimates a behavior of the vehicle body such as the sprung speed by integration processing on the estimated vehicle body acceleration.

Figure 6:
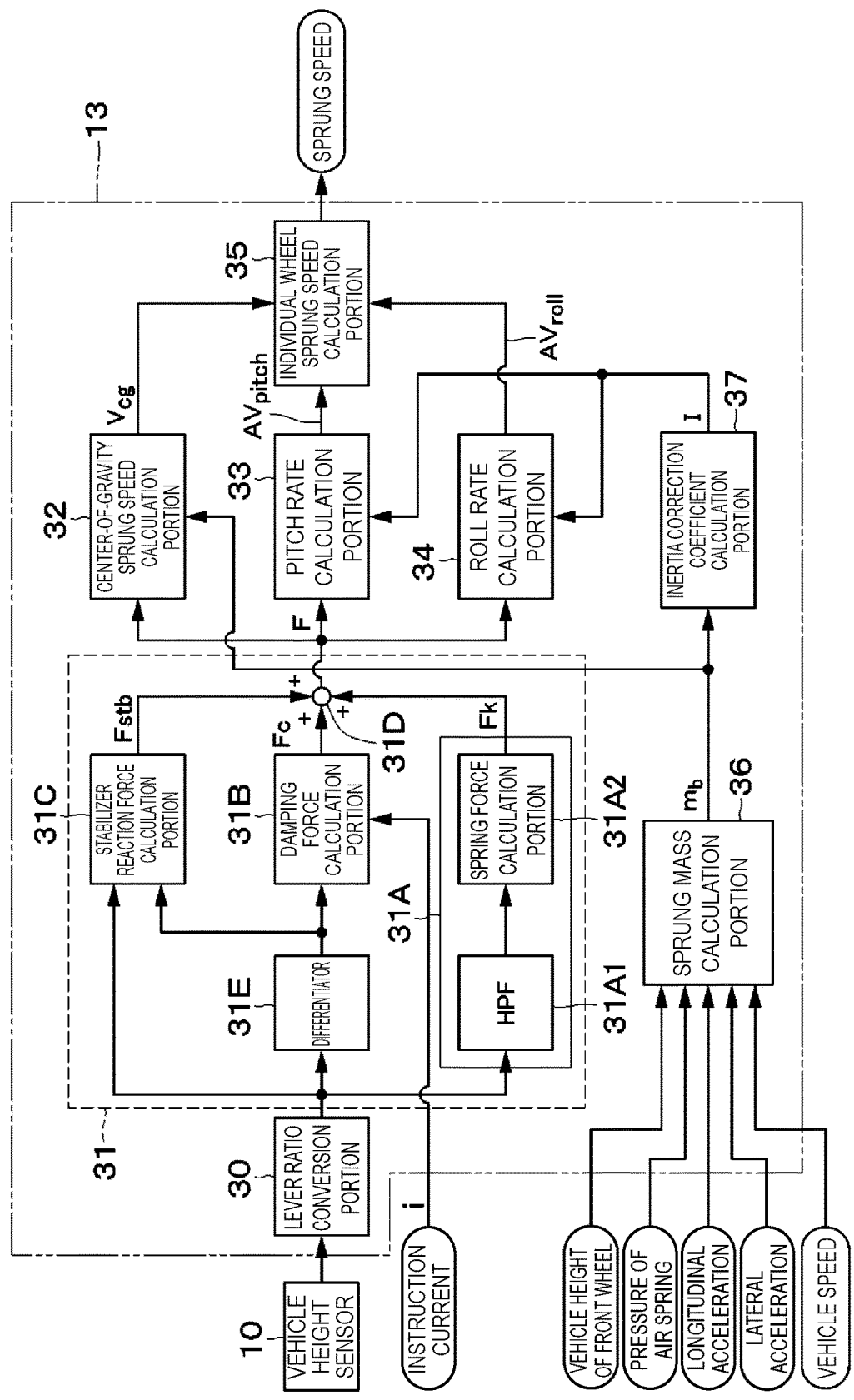
FIG. 6 is a block diagram illustrating a state estimation portion illustrated in FIG. 2.

As illustrated in FIG. 6, the state estimation portion 13 includes an external force estimation portion 31, which estimates a resultant force F as a combination of a spring force Fk on each of the wheels, a damper damping force Fc, and the stabilizer reaction force Fstb. This external force estimation portion 31 forms an external force calculation unit, which calculates an external force applied to the vehicle body 1 from the displacement calculated from the vehicle height sensor 10. In this case, the external force estimation portion 31 includes a spring force calculation portion 31A, a damper damping force calculation portion 31B, a portion 31C that calculates the stabilizer reaction force (hereinafter referred to as the stabilizer reaction force calculation portion 31C), and an adder 31D. In addition thereto, the external force estimation portion 31 includes a differentiator 31E, which differentiates the vehicle height of each of the wheels to calculate the relative speed between the vehicle body 1 and the wheel 2.

Further, a lever ratio conversion portion 30 is provided at a stage preceding to the external force estimation portion 31. The vehicle height sensor 10 is connected to an input side of the lever ratio conversion portion 30. The lever ratio conversion portion 30 acquires an actual vehicle height value from the detection signal of the vehicle height sensor 10 based on a lever ratio.

The spring force calculation portion 31A calculates the spring force Fk generated on the vehicle body 1 based on the vehicle height of each of the wheels. This spring force calculation portion 31A includes a high-pass filter 31A1 and a spring constant multiplication portion 31A2. The high-pass filter 31A1 removes an extremely low-frequency component (for example, 0.2 Hz or lower) by performing high-pass filter processing with respect to the vehicle height to prevent drifting in the integration processing. On the other hand, a low-frequency component is already cut off from the relative speed by the differential processing, and therefore the high-pass filter processing does not have to be performed with respect to the relative speed. The spring constant multiplication portion 31A2 multiplies the respective vehicle heights of the wheels that are output from the high-pass filter 31A1 by the spring constant ks of the suspension apparatus 5 or 8, thereby calculating the respective spring forces FkFR, FkFL, FkRR, and FkRL of the wheels.

The damper damping force calculation portion 31B calculates the damper damping force Fc generated on the vehicle body 1 based on the relative speed output from the differentiator 31E and the instruction current i. At this time, the damping characteristic determination portion 14 of the controller 11 outputs the instruction current i for acquiring a desired damping force according to the relative speed. Therefore, the damping force Fc of the damper 7 can be estimated by identifying the relative speed and the instruction current i. The damper damping force calculation portion 31B calculates the respective damper damping forces FcFR, FcFL, FcRR, and FcRL of the wheels with use thereof.

Figure 7:
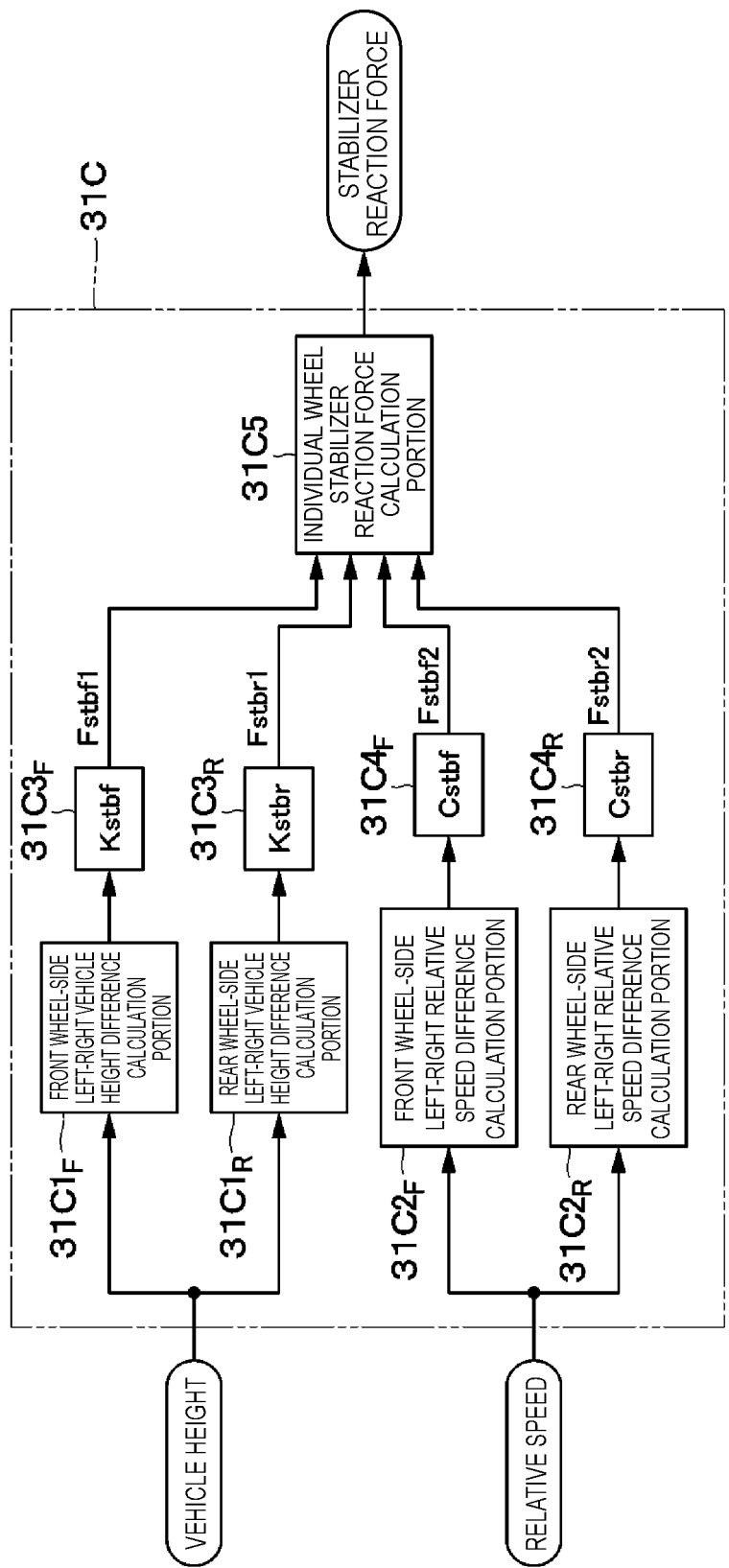
FIG. 7 is a block diagram illustrating a stabilizer reaction force calculation portion illustrated in FIG. 6.

The stabilizer reaction force calculation portion 31C forms a stabilizer reaction force calculation unit, which calculates the stabilizer reaction force Fstb based on a difference between the values of the vehicle height sensors 10 provided on the left and right wheels. This stabilizer reaction force calculation portion 31C calculates the stabilizer reaction force Fstb generated on the stabilizer 4 based on the vehicle height and the relative speed of each of the wheels. As illustrated in FIG. 7, the stabilizer reaction force calculation portion 31C includes a left-right vehicle height difference calculation portion 31C1, a left-right relative speed difference calculation portion 31C2, reaction force calculation portions 31C3 and 31C4, and an individual wheel stabilizer reaction force calculation portion 31C5. The first reaction force calculation portion 31C3 calculates first stabilizer reaction forces Fstbf1 and Fstbr1 based on a difference between relative displacements of the left and right wheels by multiplying a difference between the left and right vehicle heights acquired by the left-right vehicle height difference calculation portion 31C1 by predetermined constants Kstbf and Kstbr (for example, spring constants of the stabilizers 4). The second reaction force calculation portion 31C4 calculates second stabilizer reaction forces Fstbf2 and Fstbr2 based on a difference between the relative speeds of the left and right wheels by multiplying a difference between the left and right relative speeds acquired by the left-right relative speed difference calculation portion 31C2 by predetermined constants Cstbf and Cstbr. In this case, the stabilizers 4 are provided on the front wheel side and the rear wheel side. Therefore, both the first stabilizer reaction forces Fstbf1 and Fstbr1 and the second stabilizer reaction forces Fstbf2 and Fstbr2 are calculated individually differently for the front wheel side and the rear wheel side. The individual wheel stabilizer reaction force calculation portion 31C5 outputs the respective stabilizer reaction forces FstbFR, FstbFL, FstbRR, and FstbRL of the wheels by adding the first stabilizer reaction forces Fstbf1 and Fstbr1 for the front wheel side and the rear wheel side and the second stabilizer reaction forces Fstbf2 and Fstbr2 for the front wheel side and the rear wheel side for each of the wheels.

The adder 31D calculates the resultant forces FFL, FFR, FRL, and FRR generated on the respective wheels by adding the calculated spring force Fk, the damper damping force Fc, and the stabilizer reaction force Fstb for each of the wheels.

The state estimation portion 13 calculates a vertical resultant force Fcg, a roll moment Mroll, and a pitch moment Mpitch applied to the vehicle body 1 from the respective resultant forces FFL, FFR, FRL, and FRR of the wheels in consideration of a geometric relationship among the individual wheels. A vertical acceleration A can be calculated by dividing the calculated vertical resultant force Fcg by the mass mb (the sprung mass). Similarly, a roll angular acceleration αroll and a pitch angular acceleration αpitch can be calculated by dividing the calculated roll moment Mroll and pitch moment Mpitch by inertias I (a roll inertia and a pitch inertia). The sprung speed Vcg, the roll rate AVroll (the roll angular speed), and the pitch rate AVpitch (the pitch angular speed) can be calculated by subjecting the acceleration A, and the angular accelerations αroll and αpitch calculated in this manner to integration and a filter having a characteristic of a high-pass filter. Further, the estimated mass mb is used when the acceleration A and the like are calculated so as to be able to maintain estimation accuracy even when the mass of the vehicle body is changed. Due to this configuration, the state estimation portion 13 takes the change in the mass into consideration directly, thereby achieving a reduction in an influence of the change in the mass.

To perform the above-described calculation processing, the state estimation portion 13 includes a center-of-gravity sprung speed calculation portion 32, a pitch rate calculation portion 33, a roll rate calculation portion 34, and an individual wheel sprung speed calculation portion 35 (refer to FIG. 6). In addition thereto, the state estimation portion 13 includes a sprung mass calculation portion 36 and an inertia correction coefficient calculation portion 37.

Figure 8:
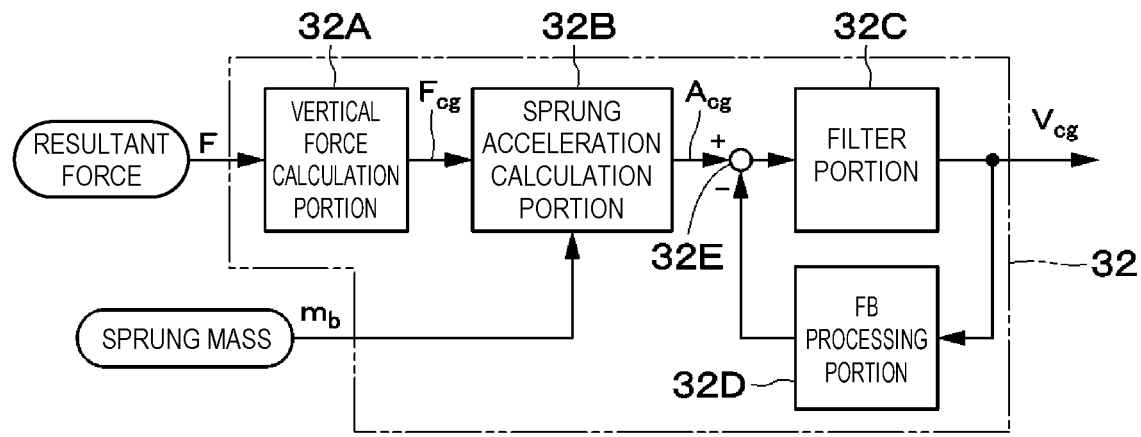
FIG. 8 is a block diagram illustrating a center-of-gravity sprung speed calculation portion illustrated in FIG. 6.

As illustrated in FIG. 8, the center-of-gravity sprung speed calculation portion 32 includes a vertical force calculation portion 32A, a sprung acceleration calculation portion 32B, the filter portion 32C, an FB processing portion 32D, and a subtractor 32E.

The vertical force calculation portion 32A forms a vertical force calculation unit, which calculates a vertical force on the vehicle body 1 (the vertical resultant force Fcg at the center of gravity) from the external force calculated by the external force estimation portion 31 (the resultant forces FFL, FFR, FRL, and FRR of the four wheels). More specifically, the vertical force calculation portion 32A calculates the vertical resultant force Fcg at the center of gravity by adding the resultant forces FFL, FFR, FRL, and FRR of the four wheels (Fcg=FFL+FFR+FRL+FRR). The center-of-gravity sprung speed calculation portion 32 is configured to calculate the vertical force at the center of gravity of the vehicle body 1. The present invention is not limited thereto, and the vertical force may be calculated at any portion of the vehicle body 1 as long as the position is specified in advance.

The sprung acceleration calculation portion 32B forms an acceleration calculation unit, which calculates an acceleration (a sprung acceleration Acg) from the vertical force (the vertical resultant force Fcg) calculated by the vertical force calculation portion 32A. This sprung acceleration calculation portion 32B calculates the sprung acceleration Acg with use of the vertical resultant force Fcg calculated by the vertical force calculation portion 32A and the mass mb calculated by the sprung mass calculation portion 36. More specifically, the sprung acceleration calculation portion 32B calculates the sprung acceleration Acg at the center of gravity by dividing the vertical resultant force Fcg by the sprung mass mb estimated by the sprung mass calculation portion 36.

The filter portion 32C calculates the sprung speed Vcg at the center of gravity by performing high-pass filter processing in addition to integrating the sprung acceleration Acg. This filter portion 32C forms a sprung speed estimation unit, which estimates the sprung speed Vcg of the vehicle body 1 from the acceleration (the sprung acceleration Acg) calculated by the sprung acceleration calculation portion 32B.

The FB processing portion 32D multiplies the calculated sprung speed Vcg by a predetermined gain, and feeds back it to the sprung acceleration Acg before the integration calculation. The subtractor 32E subtracts the output from the FB processing portion 32D from the sprung acceleration Acg before the integration calculation. In this manner, the FB processing portion 32D and the subtractor 32E feed back the value acquired by multiplying the speed component by the predetermined gain to the acceleration before the integration calculation, and cause it to function as a damping term. In other words, the center-of-gravity sprung speed calculation portion 32 corrects the acceleration by multiplying the estimated sprung speed Vcg by the predetermined gain and feeding back it to the sprung acceleration Acg calculated by the sprung acceleration calculation portion 32B, and acquires the estimated sprung speed Vcg based on the corrected acceleration. By this configuration, the FB processing portion 32D and the subtractor 32E prevent divergence of the result of the calculation due to an error in the integration.

Figure 9:
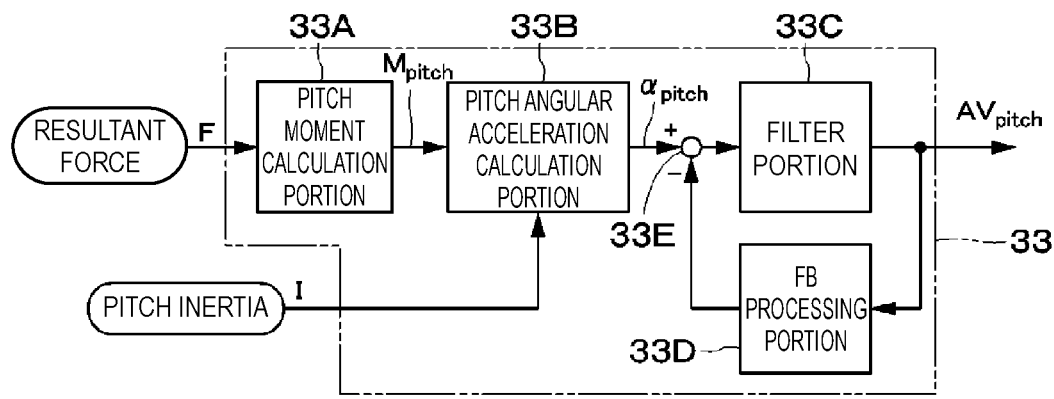
FIG. 9 is a block diagram illustrating a pitch rate calculation portion illustrated in FIG. 6.

As illustrated in FIG. 9, the pitch rate calculation portion 33 includes a pitch moment calculation portion 33A, a pitch angular acceleration calculation portion 33B, a filter portion 33C, an FB processing portion 33D, and a subtractor 33E.

The pitch moment calculation portion 33A calculates a pitch moment Mpitch based on the following equation, an equation 1 from the respective resultant forces FFL, FFR, FRL, and FRR of the wheels in consideration of the geometric positional relationship among the four wheels. In the equation 1, Lf represents a distance from the position of the suspension apparatus 5 on the front wheel side to the center of gravity, and Lr represents a distance from the position of the suspension apparatus 8 on the rear wheel side to the center of gravity.

$$M_{pitch} = (F_{FL} + F_{FR}) \times Lf - (F_{RL} + F_{RR}) \times Lr \quad \text{[Equation 1]}$$

The pitch angular acceleration calculation portion 33B calculates a pitch angular acceleration αpitch by dividing the pitch moment Mpitch by the inertial mass I (the pitch inertia) estimated by the sprung mass calculation portion 36 and the inertia correction coefficient calculation portion 37. This pitch angular acceleration calculation portion 33B forms a pitch angular acceleration calculation unit, which calculates the pitch angular acceleration αpitch from the value calculated by the external force estimation portion 31 and the position at which the damper 7 is installed. Now, the inertia correction coefficient calculation portion 37 calculates the inertial mass I of the vehicle body 1 by multiplying the sprung mass mb estimated by the sprung mass calculation portion 36 by, for example, a predetermined coefficient acquired from an experiment in advance.

The filter portion 33C calculates a pitch rate AVpitch by performing high-pass filter processing in addition to integrating the pitch angular acceleration αpitch. The FB processing portion 33D multiplies the calculated pitch rate AVpitch by a predetermined gain, and feeds back it to the pitch angular acceleration before the integration calculation. The subtractor 33E subtracts the output from the FB processing portion 33D from the pitch angular acceleration αpitch before the integration calculation. In other words, the pitch rate calculation portion 33 corrects the angular acceleration by multiplying the estimated pitch rate AVpitch by the predetermined gain and feeding back it to the pitch angular acceleration pitch αpitch calculated by the pitch angular acceleration calculation portion 33B, and acquires the estimated pitch rate AVpitch based on the corrected angular acceleration. By this configuration, the FB processing portion 33D and the subtractor 33E prevent divergence of the result of the calculation due to an error in the integration.

Figure 10:
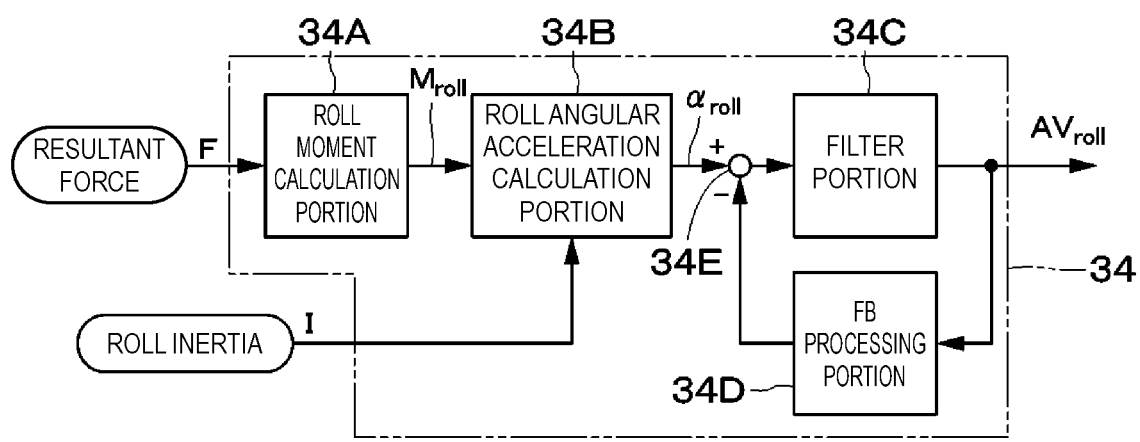
FIG. 10 is a block diagram illustrating a roll rate calculation portion illustrated in FIG. 6.

As illustrated in FIG. 10, the roll rate calculation portion 34 includes a roll moment calculation portion 34A, a roll angular acceleration calculation portion 34B, a filter portion 34C, an FB processing portion 34D, and a subtractor 34E.

The roll moment calculation portion 34A calculates a roll moment Mpitch based on the following equation, an equation 2 from the respective resultant forces FFL, FFR, FRL, and FRR of the wheels in consideration of the geometric positional relationship among the four wheels. In the equation 2, Wf represents a distance from the position of the suspension apparatus 5 on the front right wheel 2FR to the position of the suspension apparatus 5 on the front left wheel 2FL, and Wr represents a distance from the position of the suspension apparatus 8 on the rear right wheel 2RR to the position of the suspension apparatus 8 on the rear left wheel 2RL.

$$M_{roll} = (F_{FL} + F_{RL}) \times \frac{Wf}{2} - (F_{FR} + F_{RR}) \times \frac{Wr}{2} \quad \text{[Equation 2]}$$

The roll angular acceleration calculation portion 34B calculates a roll angular acceleration αroll by dividing the roll moment Mroll by the inertial mass I (the pitch inertia) estimated by the sprung mass calculation portion 36 and the inertia correction coefficient calculation portion 37. This roll angular acceleration calculation portion 34B forms a roll angular acceleration calculation unit, which calculates the roll angular acceleration αroll from the value calculated by the external force estimation portion 31 and the position at which the damper 7 is installed.

The filter portion 34C calculates a roll rate AVroll by performing high-pass filter processing in addition to integrating the roll angular acceleration αroll. The FB processing portion 34D multiplies the calculated roll rate AVroll by a predetermined gain, and feeds back it to the roll angular acceleration αroll before the integration calculation. The subtractor 34E subtracts the output from the FB processing portion 34D from the roll angular acceleration αroll before the integration calculation. In other words, the roll rate calculation portion 34 corrects the angular acceleration by multiplying the estimated roll rate AVroll by the predetermined gain and feeding back it to the roll angular acceleration pitch αroll calculated by the roll angular acceleration calculation portion 34B, and acquires the estimated roll rate AVroll based on the corrected angular acceleration. By this configuration, the FB processing portion 34D and the subtractor 34E prevent divergence of the result of the calculation due to an error in the integration.

The individual wheel sprung speed calculation portion 35 calculates the respective sprung speeds VFL, VFR, VRL, and VRR of the wheels from the sprung speed Vcg at the center of gravity, the pitch rate AVpitch, and the roll rate AVroll with use of the following equation, an equation 3 based on the geometrical relationship among the four wheels.

$$V_{FL} = V_{cg} - AV_{roll} \times \frac{Wf}{2} + AV_{pitch} \times Lf \quad \text{[Equation 3]}$$

$$V_{FR} = V_{cg} + AV_{roll} \times \frac{Wf}{2} + AV_{pitch} \times Lf$$

$$V_{RL} = V_{cg} - AV_{roll} \times \frac{Wr}{2} - AV_{pitch} \times Lr$$

$$V_{RR} = V_{cg} + AV_{roll} \times \frac{Wr}{2} - AV_{pitch} \times Lr$$

(2). Mass Correction Control

Next, mass correction control used in the present exemplary embodiment will be described. The mass compensation control is control aiming to exert a constant control performance regardless of a loaded state of the vehicle.

In other words, the mass compensation control can maintain constant estimation accuracy of estimating the vehicle state regardless of a change in the mass. In addition thereto, the mass compensation control can maintain a constant ride feeling and constant steering stability of the vehicle regardless of the change in mass. First, a mass estimation principle will be described.

(2-1). Mass Estimation Principle

The vehicle targeted at this time uses the coil spring for the front wheel, and the air levelizer used in combination with the coil spring for the rear wheel. First, a mass on the front wheel side using the coil spring will be analyzed. In the case of the coil spring, the mass can be calculated based on the Hooke's law indicated in an equation 4.

$$f = kx \quad \text{[Equation 4]}$$

In this equation, f, k, and x represent the spring force [N], the spring constant [N/m], and a spring displacement [m], respectively. Based thereon, a mass change Δm [kg] can be calculated in the following manner from a vehicle height change Δx [kg] from a reference position and a gravitational acceleration g [m/s2] (for example, g=9.81 m/s2).

$$\Delta m = \frac{k \Delta x}{g} \quad \text{[Equation 5]}$$

Based thereon, a current mass mF [kg] on the front wheel side can be calculated in the following manner from a mass moriginal [kg] at the reference position and an equation 6.

$$m_F = m_{original} + \Delta m = m_{original} + \frac{k \Delta x}{g} \quad \text{[Equation 6]}$$

Next, a mass on the rear wheel side using the air levelizer will be analyzed. An air spring reaction force fas [N] can be calculated from a pressure-receiving area S [m2] and a pressure Pas [Pa] based on an equation 7.

$$f_{as} = S \times P_{as} \quad \text{[Equation 7]}$$

Now, the pressure-receiving area S changes according to the vehicle height. However, the vehicle height is kept constant due to the air levelizer. In addition thereto, the change in the pressure-receiving area S due to the change in the vehicle height is small. From these facts, hypothetically assuming that the pressure-receiving area S is kept constant without changing from an area at the reference vehicle height, a mass mR [kg] on the rear wheel side can be calculated in the following manner from the gravitational acceleration g.

$$m_R = \frac{S \times P_{as}}{g} \quad \text{[Equation 8]}$$

However, the change in the vehicle height and the change in the pressure are affected by turning of the vehicle, speed-up/slow-down, and the road surface. Therefore, whether the vehicle is currently in any of states of speeding up or slowing down, turning, and running on a slope road is determined with use of, for example, a longitudinal acceleration and a lateral acceleration. After that, processing for updating the mass estimation is prohibited if at least any one of the longitudinal acceleration and the lateral acceleration is a threshold value or higher.

Further, low-pass filter processing based on an extremely low frequency (for example, 0.2 Hz) is performed on the vehicle height and a pressure sensor signal to eliminate influence of a road surface disturbance. The estimated mass is updated if the mass change satisfies conditions of reaching or exceeding a setting value and a setting time to take an influence of noise into consideration in addition thereto. Further, it is difficult to estimate the masses on the left and right wheels independently of each other due to the influence of the stabilizer. On the other hand, the control performance is considered to be little affected by a difference between the masses on the left side and the right side. From these facts, in the present embodiment, the controller 11 is configured to make the estimation based on a change value of an average vehicle height of the left and right wheels and a change value of an average pressure of the left and right wheels with respect to the front and rear wheels independently of each other. It is considered that making the estimation with respect to the left and right wheels independently of each other may be more effective to considerably improve the estimation accuracy depending on a vehicle in some cases, and therefore the estimation may be made with respect to the left and right wheels independently of each other.

(2-2). Configuration of Mass Estimation Portion

Figure 11:
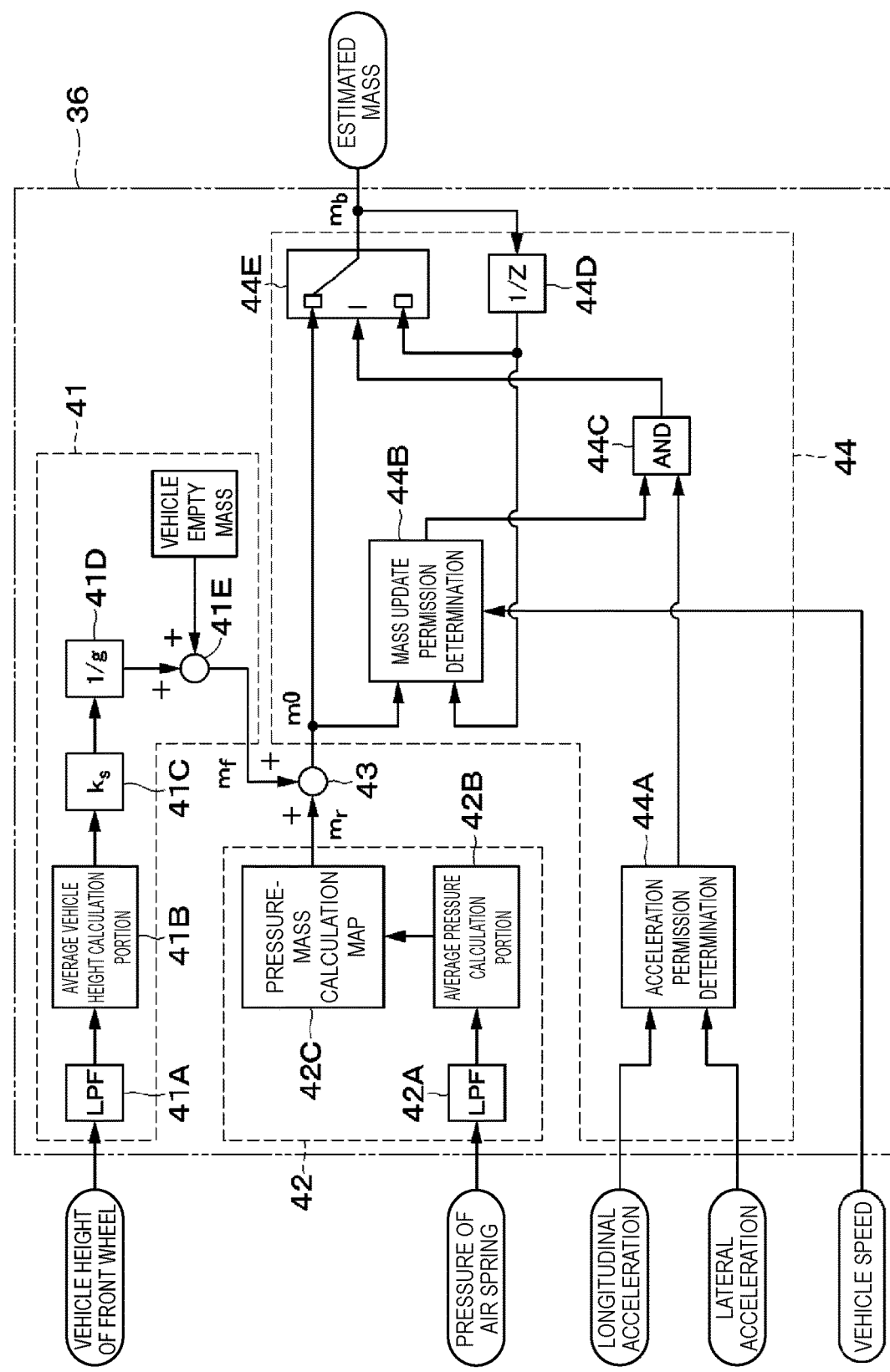
FIG. 11 is a block diagram illustrating a sprung mass calculation portion illustrated in FIG. 6.

FIG. 11 illustrates a block diagram of the above-described mass estimation. The sprung mass calculation portion 36 serves to estimate the mass of the vehicle body 1. This sprung mass calculation portion 36 includes a front wheel-side mass calculation portion 41, a rear wheel-side calculation portion 42, a front-rear wheel mass integration portion 43, and a mass update portion 44.

The front wheel-side mass calculation portion 41 includes a low-pass filter 41A, an average vehicle height calculation portion 41B, a spring force calculation portion 41C, a mass change calculation portion 41D, and an addition portion 41E. The low-pass filter 41A performs low-pass filter processing based on an extremely low frequency (for example, 0.2 Hz) on the detected vehicle height. The average vehicle height calculation portion 41B calculates, with respect to the vehicle heights on the left side and the right side that are output from the low-pass filter 41A, an average value of them. The spring force calculation portion 41C calculates the spring force by multiplying the average value of the vehicle heights on the left side and the right side by the spring constant ks of the coil spring 6. The mass change calculation portion 41D calculates the change amount Δm of the mass from a vehicle empty state by dividing the spring force by the gravitational acceleration g. The adder 41E adds the vehicle empty mass moriginal to the mass change amount Δm, thereby calculating the current mass mF on the front wheel side.

The rear wheel-side mass calculation portion 42 includes a low-pass filter 42A, an average pressure calculation portion 42B, and a mass calculation map 42C. The low-pass filter 42A performs low-pass filter processing based on an extremely low frequency (for example, 0.2 Hz) on the detected pressure Pas. The average pressure calculation portion 42B calculates, with respect to the pressures Pas of the air springs 9 on the left side and the right side that are output from the low-pass filter 42A, an average value of them. The mass calculation map 42C calculates the current mass mR on the rear wheel side from the average value of the pressures on the left side and the right side based on the relationship between the pressure and the mass indicated in the equation 8.

The front-rear wheel mass integration portion 43 integrates the mass mF on the front wheel side and the mass mR on the rear wheel side, thereby calculating a mass m0 of the entire vehicle body. The front-rear wheel mass integration portion 43 outputs the calculated mass m0 at this time toward the mass update portion 44.

The mass update portion 44 includes an acceleration permission determination portion 44A, a mass update permission determination portion 44B, an AND circuit 44C, a delay circuit 44D, and a switching switch 44E. The acceleration permission determination portion 44A determines whether the vehicle is currently in any of the states of speeding up or slowing down, turning, and running on a slope road surface based on the longitudinal acceleration and the lateral acceleration. The acceleration permission determination portion 44A outputs a permission signal permitting the update of the mass if none of these three conditions are satisfied, and otherwise outputs a prohibition signal prohibiting the update of the mass.

The mass m0 at this time, which is output from the front-rear wheel mass integration portion 43, and the mass mb at the previous time (in the immediately preceding cycle), which is output from the delay circuit 44D, are input to the mass update permission determination portion 44B. The mass update permission determination portion 44B calculates a change amount between the mass mb at the previous time and the mass m0 at this time. The mass update permission determination portion 44B determines whether the change in the mass between the previous time and this time satisfies the conditions of reaching or exceeding the setting value and the setting time. The mass update permission determination portion 44B outputs a permission signal permitting the update of the mass when both of these two conditions are satisfied, and otherwise outputs a prohibition signal prohibiting the update of the mass.

The AND circuit 44C connects the switching switch 44E to the front-rear wheel mass integration portion 43 when both the acceleration permission determination portion 44A and the mass update permission determination portion 44B output the permission signals. As a result, the switching switch 44E outputs the mass m0 at this time that is calculated by the front-rear wheel mass integration portion 43 as the estimated mass mb of the vehicle body. On the other hand, the AND circuit 44C connects the switching switch 44E to the delay circuit 44D when at least any one of the acceleration permission determination portion 44A and the mass update permission determination portion 44B outputs the prohibition signal. As a result, the switching switch 44E outputs the mass mb at the previous time that is output from the delay circuit 44D as the estimated mass mb of the vehicle body. At this time, the sprung mass calculation portion 36 outputs the value at the previous time without updating the estimated mass mb of the vehicle body.

The mass mb output from the sprung mass calculation portion 36 is used when the vehicle state such as the sprung speed is estimated. As a result, the influence due to the change in the mass can be taken into consideration.

Figure 15:
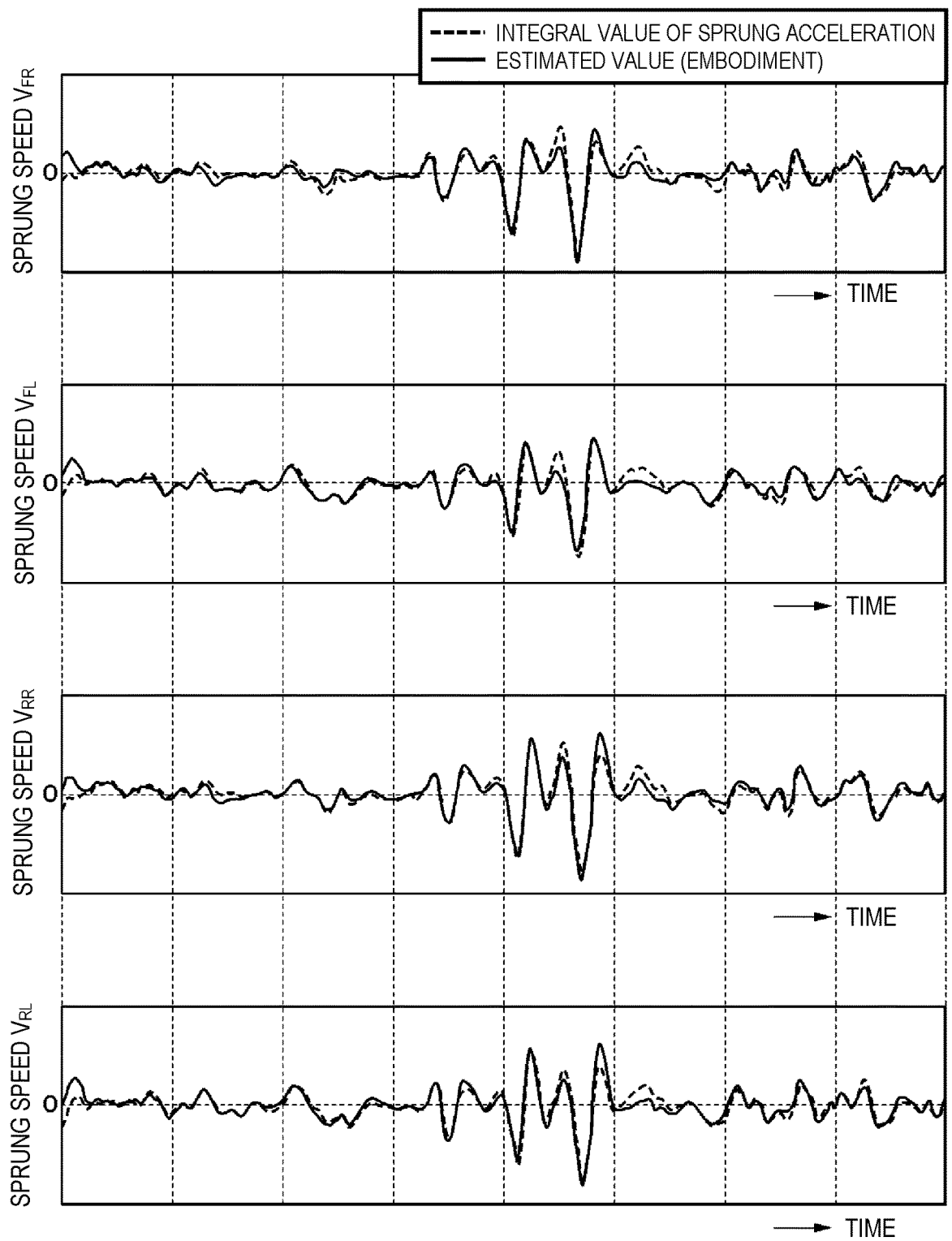
FIG. 15 illustrates a line representing a characteristic of a change in a sprung speed over time with respect to each of four wheels.

A running test was conducted to verify effectiveness of the vehicle state estimation according to the present embodiment. In this running test, the suspension control apparatus according to the present embodiment was mounted on an actual vehicle, and this vehicle was driven on a wavy road. FIG. 15 illustrates results thereof.

Solid lines in FIG. 15 indicate the results (the estimated values) of the calculations of the sprung speeds VFR, VFL, VRR, and VRL by the state estimation portion 13. Broken lines in FIG. 15 indicate sprung speeds (comparative values) acquired by integrating the sprung accelerations. As indicated in the results in FIG. 15, the sprung speeds VFR, VFL, VRR, and VRL estimated by the state estimation portion 13 approximately matched the sprung speeds acquired by integrating the sprung accelerations, and it can be understood that the sprung speeds were able to be estimated accurately even on the wavy road surface where the displacement was large.

In this manner, according to the present embodiment, the controller 11 includes the external force estimation portion 31, which calculates the external force applied to the vehicle body 1 from the displacement calculated from the vehicle height sensor 10, the vertical force calculation portion 32A, which calculates the vertical resultant force Fcg on the vehicle body 1 from the calculated external force, the sprung acceleration calculation portion 32B, which calculates the sprung acceleration Acg from the calculated vertical resultant force Fcg, the filter portion 32C, which estimates the sprung speed Vcg of the vehicle body 1 from the calculated sprung acceleration Acg, and the damping characteristic determination portion 14, which acquires the damping characteristic based on the estimated sprung speed.

Due to this configuration, the vehicle height sensor 10 existing on the vehicle can be used instead of the acceleration sensor, so that cost of the entire system can be reduced. Further, the filter portion 32C can estimate the sprung speed Vcg by, for example, integrating the calculated sprung acceleration Acg. Therefore, a calculation load on the controller 11 can be reduced by using the integration calculation instead of the observer. This can allow a low-performance microcomputer to be used for the controller 11, thereby reducing cost of the controller 11. In addition thereto, the sprung speed Vcg can be estimated with use of the integration calculation instead of the observer, so that the number of turning parameters can be reduced. As a result, the number of processes for adapting the tuning parameters can be reduced, so that development cost can be reduced.

Further, the controller 11 further includes the roll angular acceleration calculation portion 34B, which calculates the roll angular acceleration $\alpha$roll from the value calculated by the external force estimation portion 31 and the position at which each of the suspension apparatuses 5 and 8 is installed, and the pitch angular acceleration calculation portion 33B, which calculates the pitch angular acceleration $\alpha$pitch from the value calculated by the external force estimation portion 31 and the position at which each of the suspension apparatuses 5 and 8 is installed. The controller 11 calculates the roll rate AVroll and the pitch rate AVpitch from the values of the roll angular acceleration $\alpha$roll and the pitch angular acceleration $\alpha$pitch. The damping characteristic determination portion 14 acquires the damping characteristic based on the results of the calculations of the roll rate AVroll and the pitch rate AVpitch and the estimated sprung speed Vcg.

Due to this configuration, the roll and the pitch can be taken into consideration in the full vehicle model including the four wheels. Therefore, the sprung behavior can be estimated with improved accuracy even on such a road surface that the sprung behavior is significant. As a result, the damping characteristic determination portion 14 acquires the damping characteristic based on the result of the highly accurate estimation of the sprung behavior, so that the ride comfort can be improved.

Further, the center-of-gravity sprung speed calculation portion 32 corrects the acceleration Acg by multiplying the estimated sprung speed Vcg by the predetermined gain and feeding back it to the sprung acceleration Acg calculated by the sprung acceleration calculation portion 32B, and acquires the estimated sprung speed Vcg based on the corrected sprung acceleration Acg.

Due to this configuration, the estimated sprung speed Vcg can be fed back to the sprung acceleration Acg before the integration calculation and caused to function as the damping term even when the sprung speed Vcg is acquired from the sprung acceleration Acg by the integration calculation. This can allow the controller 11 to reduce the error in the integration, thereby improving the ride comfort.

Further, the stabilizer 4 is provided on the vehicle. Then, the external force estimation portion 31 further includes the stabilizer reaction force calculation portion 31C, which calculates the stabilizer reaction force Fstb based on the difference between the values of the vehicle height sensors 10 provided on the left and right wheels 2, and calculates the external force applied to the vehicle body 1 with use of the calculated value acquired by this stabilizer reaction force calculation portion 31C.

Therefore, the external force estimation portion 31 can calculate the sprung acceleration Acg of the vehicle body 1 and the like in consideration of the stabilizer reaction force Fstb because calculating the external force applied to the vehicle body 1 with use of the stabilizer reaction force Fstb. As a result, the controller 11 can control the damping characteristic in consideration of the influence of the stabilizer 4.

Further, the controller 11 further includes the sprung mass calculation portion 36, which acquires the mass mb of the vehicle body 1 from the displacement calculated from the vehicle height sensor 10, and the sprung acceleration calculation portion 32B calculates the sprung acceleration Acg with use of the vertical resultant force Fcg calculated by the vertical force calculation portion 32A and the mass mb calculated by the sprung mass calculation portion 36.

Due to this configuration, the sprung acceleration Acg can be calculated by dividing the vertical resultant force Fcg calculated by the vertical force calculation portion 32A by the mass mb calculated by the sprung mass calculation portion 36. Therefore, even when the number of passengers or a load weight is changed, the sprung acceleration Acg can be calculated with use of the sprung mass mb estimated from, for example, the displacement calculated from the vehicle height sensor 10, so that the influence due to the change in the sprung mass mb can be directly taken into consideration. This results in improvement of the estimation accuracy when the weight is changed, and therefore can improve the ride comfort.

In the above-described embodiment, the damping characteristic determination portion 14 is assumed to calculate the damping coefficient as the damping characteristic of the damper 7 by the roll BLQ 15 and the vertical BLQ 16. The present invention is not limited thereto, and the damping characteristic determination portion may include, for example, a skyhook controller or an H∞ controller that calculates the target damping force. In other words, various kinds of controllers capable of controlling the damping characteristic of the damper according to the state of the vehicle can be employed for the damping characteristic determination portion.

Further, the damping characteristic determination portion 14 includes the damping coefficient map 17 acquired in advance based on the test data or the like, and is configured to identify the instruction current according to the damping characteristic from the damping coefficient and the relative speed based on the damping coefficient map 17. The present invention is not limited thereto, and the damping characteristic may be acquired based on various kinds of calculation equations and/or the like.

In the above-described embodiment, the state estimation portion 13 is assumed to estimate the state of the vehicle body with use of the vehicle model incorporating the stabilizer. The present invention is not limited thereto, and the state of the vehicle body may be estimated with use of a vehicle model from which the stabilizer is removed. In this case, the external force estimation portion 31 is configured to omit the stabilizer reaction force calculation portion 31C.

In the above-described embodiment, the vehicle is configured in such a manner that the suspension apparatus 5 including the coil spring is provided on the front wheel side and the suspension apparatus 8 including the air spring 9 is provided on the rear wheel side. The present invention is not limited thereto, and the suspension apparatus 5 including the coil spring may be employed on all of the four wheels. In this case, the rear wheel-side mass calculation portion 42 of the sprung mass calculation portion 36 is configured identically to the front wheel-side mass calculation portion 41.

Similarly, the suspension apparatus 8 including the air spring 9 may be employed on all of the four wheels. In this case, the front wheel-side mass calculation portion 41 of the sprung mass calculation portion 36 is configured identically to the rear wheel-side mass calculation portion 42.

The rear wheel-side mass calculation portion 42 according to the above-described embodiment may use a calculation based on a map storing therein a relationship among the pressure-receiving area, the vehicle height, and the pressure, or use an equation for calculating the pressure-receiving area from the vehicle height and the pressure. Alternatively, the rear wheel-side mass calculation portion 42 may be configured to directly acquire the mass with use of a map, an equation, or the like from the vehicle height and the pressure.

In the above-described embodiment, the vertical, roll, and pitch behaviors are calculated based on the full vehicle model including the four wheels with use of the external force calculated by the external force estimation portion 31, but the roll and pitch behaviors may be calculated by calculating the vertical motion of each of the wheels based on the ¼ vehicle illustrated in FIG. 12 instead of the full vehicle model and referring to a kinematic relationship from this vertical motion of each of the wheels.

In the above-described embodiment, the suspension apparatus has been described based on the example in which the damping force adjustable damper 7 constructed with use of the semi-active damper is employed as the damping force adjustable shock absorber, but may be configured to use an active damper (any of an electric actuator and a hydraulic actuator) instead of it.

Possible configurations as the suspension control apparatus based on the above-described embodiment include the following examples.

As a first configuration, a suspension control apparatus includes a damping force adjustable shock absorber disposed between a vehicle body of a vehicle and each of four wheels and having a damping characteristic varying according to an instruction from outside, a vehicle height sensor provided on each of the wheels of the vehicle body, and a control device configured to control the damping characteristic. The controller includes an external force calculation unit configured to calculate an external force applied to the vehicle body from a displacement calculated from the vehicle height sensor, a vertical force calculation unit configured to acquire a vertical force on the vehicle body from this calculated external force, an acceleration calculation unit configured to calculate an acceleration from the vertical force acquired by the vertical force calculation unit, a sprung speed estimation unit configured to estimate a sprung speed of the vehicle body from the acceleration calculated by the acceleration calculation unit, and a damping characteristic determination unit configured to acquire the damping characteristic based on the estimated sprung speed acquired by the sprung speed estimation unit.

According to this first configuration, the vehicle height sensor existing on the vehicle can be used instead of an acceleration sensor, so that cost of the entire system can be reduced. Further, the sprung speed estimation unit can estimate the sprung speed by, for example, integrating the acceleration calculated by the acceleration calculation unit. Therefore, a calculation load on the control device can be reduced by using the integration calculation instead of an observer. This can allow a low-performance microcomputer to be used for the control device, thereby reducing cost of the control device. In addition thereto, the sprung speed can be estimated with use of the integration calculation instead of the observer, so that the number of turning parameters can be reduced. As a result, the number of processes for adapting the tuning parameters can be reduced, so that development cost can be reduced.

As a second configuration, the control device further includes a roll angular acceleration calculation unit configured to calculate a roll angular acceleration from the value calculated by the external force detection unit and a position at which the damping force adjustable shock absorber is installed, and a pitch angular acceleration calculation unit configured to calculate a pitch angular acceleration from the value calculated by the external force detection unit and the position at which the damping force adjustable shock absorber is installed. The control device calculates a roll rate and a pitch rate from the roll angular acceleration and the pitch angular acceleration, and acquires the damping characteristic by the damping characteristic determination unit based on results of these calculations and the estimated sprung speed.

According to this second configuration, a roll and a pitch can be taken into consideration in a full vehicle model including four wheels. Therefore, a sprung behavior can be estimated with improved accuracy even on such a road surface that the sprung behavior is significant. As a result, the damping characteristic determination unit acquires the damping characteristic based on the result of the highly accurate estimation of the sprung behavior, so that ride comfort can be improved.

As a third configuration, the control device corrects the acceleration by multiplying the estimated sprung speed by a predetermined gain and feeding back it to the acceleration calculated by the acceleration calculation unit, and acquires the estimated sprung speed based on the corrected acceleration.

According to this third configuration, the estimated sprung speed can be fed back to the acceleration before the integration calculation and caused to function as a damping term even when, for example, the sprung speed is acquired from the acceleration by the integration calculation. This can allow the control device to reduce an error in the integration, thereby improving the ride comfort.

As a fourth configuration, a stabilizer mechanism is provided on the vehicle. The external force calculation unit further includes a stabilizer reaction force calculation unit configured to calculate a stabilizer reaction force based on a difference between values of the vehicle height sensors provided on left and right wheels, and calculates the external force applied to the vehicle body with use of the calculated value acquired by this stabilizer reaction force calculation unit.

According to this fourth configuration, the external force calculation unit can calculate the acceleration of the vehicle body and the like in consideration of the stabilizer reaction force because calculating the external force applied to the vehicle body with use of the stabilizer reaction force. As a result, the control device can control the damping characteristic in consideration of an influence of the stabilizer.

As a fifth configuration, the control device further includes a mass calculation unit configured to acquire a mass of the vehicle body from the displacement calculated from the vehicle height sensor. The acceleration calculation unit calculates the acceleration with use of the vertical force acquired by the vertical force calculation unit and the mass acquired by this mass calculation unit.

According to this fifth configuration, the acceleration can be calculated by dividing the vertical force acquired by the vertical force calculation unit by the mass acquired by this mass calculation unit. Therefore, even when the number of passengers or a load weight is changed, the sprung acceleration can be calculated with use of a sprung mass estimated from, for example, the displacement calculated from the vehicle height sensor, so that an influence due to a change in the sprung mass can be directly taken into consideration. This results in improvement of the estimation accuracy when the weight is changed, and therefore can improve the ride comfort.

The present invention is not limited to the above-described embodiment, and includes various modifications. For example, the above-described embodiment has been described in detail to facilitate better understanding of the present invention, and the present invention is not necessarily limited to the configuration including all of the described features. Further, a part of the configuration of some embodiment can be replaced with the configuration of another embodiment, and some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2016-189922 filed on Sep. 28, 2016. The entire disclosure of Japanese Patent Application No. 2016-189922 filed on Sep. 28, 2016 including the specification, the claims, the drawings, and the abstract is incorporated herein by reference in its entirety.

REFERENCE SIGN LIST

1 vehicle body
2 wheel
4 stabilizer (stabilizer mechanism)
5, 8 suspension apparatus
7 damping force adjustable damper (damping force adjustable shock absorber)
10 vehicle height sensor
11 controller (control device)
13 state estimation portion
14 damping characteristic determination portion (damping characteristic determination unit)
31 external force estimation portion (external force calculation unit)

31C stabilizer reaction force calculation portion (stabilizer reaction force calculation unit)
32 center-of-gravity sprung speed calculation portion
32A vertical force calculation portion (vertical force calculation unit)
32B sprung acceleration calculation portion (acceleration calculation unit)
37C filter portion (sprung speed estimation unit)
33 pitch rate calculation portion
33B pitch angular acceleration calculation portion (pitch angular acceleration calculation unit)
34 roll rate calculation portion
34B roll angular acceleration calculation portion (roll angular acceleration calculation unit)
35 individual wheel sprung speed calculation portion
36 sprung mass calculation portion (mass calculation unit)

The invention claimed is:

1. A suspension control apparatus comprising:
a damping force adjustable shock absorber disposed between a vehicle body of a vehicle and each of four wheels and having a damping characteristic varying according to an instruction from outside;
a vehicle height sensor provided on each of the wheels of the vehicle body; and
a control device configured to control the damping characteristic,
wherein the controller includes
an external force calculation unit configured to calculate an external force applied to the vehicle body from a displacement calculated from the vehicle height sensor,
a vertical force calculation unit configured to acquire a vertical force on the vehicle body from this calculated external force,
an acceleration calculation unit configured to calculate an acceleration from the vertical force acquired by the vertical force calculation unit,
a sprung speed estimation unit configured to estimate a sprung speed of the vehicle body from the acceleration calculated by the acceleration calculation unit, and
a damping characteristic determination unit configured to acquire the damping characteristic based on the estimated sprung speed acquired by the sprung speed estimation unit.

2. The suspension control apparatus according to claim 1, wherein the control device further includes
a roll angular acceleration calculation unit configured to calculate a roll angular acceleration from the value calculated by the external force detection unit and a position at which the damping force adjustable shock absorber is installed, and
a pitch angular acceleration calculation unit configured to calculate a pitch angular acceleration from the value calculated by the external force detection unit and the position at which the damping force adjustable shock absorber is installed, and
wherein the control device calculates a roll rate and a pitch rate from the roll angular acceleration and the pitch angular acceleration, and acquires the damping characteristic by the damping characteristic determination unit based on results of these calculations and the estimated sprung speed.

3. The suspension control apparatus according to claim 1, wherein the control device corrects the acceleration by multiplying the estimated sprung speed by a predetermined gain and feeding back it to the acceleration calculated by the acceleration calculation unit, and acquires the estimated sprung speed based on the corrected acceleration.

4. The suspension control apparatus according to claim 1, wherein a stabilizer mechanism is provided on the vehicle, and
wherein the external force calculation unit further includes a stabilizer reaction force calculation unit configured to calculate a stabilizer reaction force based on a difference between values of the vehicle height sensors provided on left and right wheels, and calculates the external force applied to the vehicle body with use of the calculated value acquired by this stabilizer reaction force calculation unit.

5. The suspension control apparatus according to claim 2, wherein the control device further includes a mass calculation unit configured to acquire a mass of the vehicle body from the displacement calculated from the vehicle height sensor, and
wherein the acceleration calculation unit calculates the acceleration with use of the vertical force acquired by the vertical force calculation unit and the mass acquired by this mass calculation unit.

6. The suspension control apparatus according to claim 2, wherein the control device corrects the acceleration by multiplying the estimated sprung speed by a predetermined gain and feeding back it to the acceleration calculated by the acceleration calculation unit, and acquires the estimated sprung speed based on the corrected acceleration.

7. The suspension control apparatus according to claim 6, wherein a stabilizer mechanism is provided on the vehicle, and
wherein the external force calculation unit further includes a stabilizer reaction force calculation unit configured to calculate a stabilizer reaction force based on a difference between values of the vehicle height sensors provided on left and right wheels, and calculates the external force applied to the vehicle body with use of the calculated value acquired by this stabilizer reaction force calculation unit.

* * * * *